United States Patent
Clark (10) Patent No.: US 9,340,240 B2
(45) Date of Patent: May 17, 2016

(54) DRAG MITIGATION SYSTEM FOR TRACTOR-TRAILER

(71) Applicant: Steven Knight Clark, Farmington, UT (US)

(72) Inventor: Steven Knight Clark, Farmington, UT (US)

(*) Notice: Subject to any disclaimer, the term of this patent is extended or adjusted under 35 U.S.C. 154(b) by 0 days.

(21) Appl. No.: 14/327,477

(22) Filed: Jul. 9, 2014

(65) Prior Publication Data

US 2015/0015028 A1    Jan. 15, 2015

Related U.S. Application Data

(60) Provisional application No. 61/844,295, filed on Jul. 9, 2013.

(51) Int. Cl.
*B62D 35/00* (2006.01)

(52) U.S. Cl.
CPC .................................. *B62D 35/001* (2013.01)

(58) Field of Classification Search
CPC .... B62D 35/00; B62D 35/001; B62D 35/007; B62D 35/002
USPC ................. 296/180.1–180.5, 181.5
See application file for complete search history.

(56) References Cited

U.S. PATENT DOCUMENTS

| | | | | |
|---|---|---|---|---|
| 5,058,837 A * | 10/1991 | Wheeler | ............... | 244/200.1 |
| 6,412,853 B1 * | 7/2002 | Richardson | ............... | 296/180.1 |
| 6,702,364 B2 * | 3/2004 | Neel | ............... | 296/180.2 |
| 6,926,345 B2 * | 8/2005 | Ortega et al. | ............... | 296/180.4 |
| 6,959,958 B2 * | 11/2005 | Basford | ............... | 296/180.1 |
| 7,431,381 B2 * | 10/2008 | Wood | ............... | 296/180.1 |
| 7,854,469 B2 * | 12/2010 | Dayton | ............... | 296/180.4 |
| 7,922,235 B1 * | 4/2011 | Smith | ............... | 296/180.2 |
| 8,770,649 B2 * | 7/2014 | Praskovsky et al. | ............... | 296/180.1 |
| 8,870,275 B1 * | 10/2014 | Schmidt | ............... | 296/212 |
| 8,899,660 B1 * | 12/2014 | Praskovskaya et al. | ... | 296/180.4 |
| 9,051,919 B2 * | 6/2015 | Jensen et al. | | |
| 2011/0175395 A1 * | 7/2011 | Guigne et al. | ............... | 296/180.3 |
| 2012/0257978 A1 * | 10/2012 | Jensen et al. | ............... | 416/223 R |
| 2013/0088039 A1 * | 4/2013 | Feight et al. | ............... | 296/180.2 |
| 2014/0167447 A1 * | 6/2014 | Meredith et al. | ............... | 296/180.4 |
| 2014/0252799 A1 * | 9/2014 | Smith | ............... | 296/180.4 |
| 2015/0015028 A1 * | 1/2015 | Clark | ............... | 296/180.3 |
| 2015/0166129 A1 * | 6/2015 | Camosy | | |

* cited by examiner

*Primary Examiner* — Gregory Blankenship
(74) *Attorney, Agent, or Firm* — Kunzler Law Group, PC (57) ABSTRACT

Disclosed herein is a vortex-generating system for a moving object that has a trailing edge. The system includes a first blade coupled to the object and positioned proximate the trailing edge, a second blade coupled to the object, positioned proximate the trailing edge, and spaced apart from the first blade. The first and second blade cooperate to induce an outwardly directed vortical flow of air away from the trailing edge of the object.

19 Claims, 9 Drawing Sheets

DRAG MITIGATION SYSTEM FOR TRACTOR-TRAILER

CROSS-REFERENCE TO RELATED APPLICATION

This application claims the benefit of U.S. Provisional Patent Application No. 61/844,295, filed on Jul. 9, 2013, which is incorporated herein by reference.

FIELD

This disclosure relates generally to systems for mitigating pressure drag on moving objects and more particularly to vortex-generating systems mounted to moving objects.

BACKGROUND

Conventional tractor-trailers include a tractor powered by an internal combustion engine and a trailer pulled by the tractor. The internal combustion engine of the tractor drives an axle of the tractor to move the trailer secured to the tractor in an articulated manner. Many tractor-trailers are used to transport cargo over long distances at relatively high rates of speed.

The shape and bulk of traditional tractor-trailers tend to promote the occurrence of aerodynamic drag on the tractor-trailers. Aerodynamic drag is a force that acts on the tractor-trailer in a direction opposing the motion of the tractor-trailer. The total aerodynamic drag on a tractor-trailer includes aerodynamic drag caused by friction between the moving air and the surface of the tractor-trailer, and pressure drag caused by pressure differentials induced by the separation of flow from the tractor-trailer. Aerodynamic drag produces undesirable consequences, such as a reduction in speed, drop in fuel efficiency, increase in operating costs, and the like.

Because of the negative consequences caused by aerodynamic drag, attempts have been made to reduce the drag due to friction drag and pressure drag. Surface finishing techniques have advanced such that friction drag is responsible for only a small portion of the total aerodynamic drag acting on tractor-trailers. In contrast, most techniques aimed at reducing pressure drag fail to adequately mitigate the pressure drag and sufficiently lessen the undesirable consequences of aerodynamic drag.

SUMMARY

The subject matter of the present application has been developed in response to the present state of the art, and in particular, in response to the problems and needs in the art that have not yet been fully solved by currently available tractor-trailers. Accordingly, the subject matter of the present application has been developed to provide a drag mitigation system for a tractor-trailer that overcomes at least some of the above-mentioned and below-mentioned shortcomings of prior art tractor-trailer configurations.

Disclosed herein is one embodiment of a vortex-generating system for a moving object that has a trailing edge. The vortex-generating system includes a first blade coupled to the object and positioned proximate the trailing edge, with the first blade being positioned at a first angle relative to a direction of the moving object. The vortex-generating system further includes a second blade coupled to the object, positioned proximate the trailing edge and spaced apart from the first blade, with the second blade being positioned at a second angle equal to the negative of the first angle.

According to one implementation, the first blade and the second blade are rotatably coupled to the object. For example, the first blade and the second blade may be rotatably coupled to the object via servo motors controlled by an electronic control module. The first blade and the second blade may each include a base plate and an air deflection portion. In one implementation, the first blade and the second blade further include an angled tip portion extending from the air deflection portion. The air deflection portion and the angled tip portion form an air impact surface. The air impact surface may have an angled, concave-like structure. In another implementation, the air impact surface has an angled, convex-like structure.

Also disclosed herein is another embodiment of a vortex-generating system for a moving object that has a trailing edge. The system includes a first blade coupled to the object and positioned proximate the trailing edge, a second blade coupled to the object, positioned proximate the trailing edge, and spaced apart from the first blade. The first and second blades cooperate to induce an outwardly directed vortical flow of air away from the trailing edge of the object.

According to one implementation, the first blade and the second blade are rotatably coupled to the object. For example, the first blade and the second blade may be rotatably coupled to the object via servo motors controlled by an electronic control module. The first blade and the second blade may each include a base plate and an air deflection portion. In one implementation, the first blade and the second blade further include an angled tip portion extending from the air deflection portion. The air deflection portion and the angled tip portion form an air impact surface. The air impact surface may have an angled, concave-like structure. In another implementation, the air impact surface has an angled, convex-like structure.

Further disclosed herein is another embodiment of a vortex-generating system for a moving object having a lateral edge across which a crosswind flows. The vortex-generating system includes a first blade coupled to the object and positioned proximate the lateral edge, a second blade coupled to the object, positioned proximate the lateral edge, and spaced apart from the first blade. The first and second blade cooperate to induce an outwardly directed vortical flow of air away from the lateral edge of the object.

According to one implementation, the first blade and the second blade each include a base plate and an air deflection portion. The first blade and the second blade may each further include an angled tip portion extending from the air deflection portion. The air deflection portion and the angled tip portion form an air impact surface that has an angled, concave-like structure, according to one implementation, and an angled, convex-like structure according to a different implementation.

Also disclosed herein is one embodiment of a tractor-trailer system. The tractor-trailer system includes a tractor having a first trailing edge and a trailer coupled to the tractor. The tractor also has a second trailing edge. The system further includes a plurality of first angled blades coupled to the tractor proximate the first trailing edge and a plurality of second angled blades coupled to the trailer proximate the second trailing edge.

Reference throughout this specification to features, advantages, or similar language does not imply that all of the features and advantages that may be realized with the present disclosure should be or are in any single embodiment or implementation of the invention. Rather, language referring to the features and advantages is understood to mean that a specific feature, advantage, or characteristic described in connection with an embodiment is included in at least one embodiment of the present disclosure. Discussion of the features and advantages, and similar language, throughout this specification may, but do not necessarily, refer to the same embodiment or implementation.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

Figure 1:
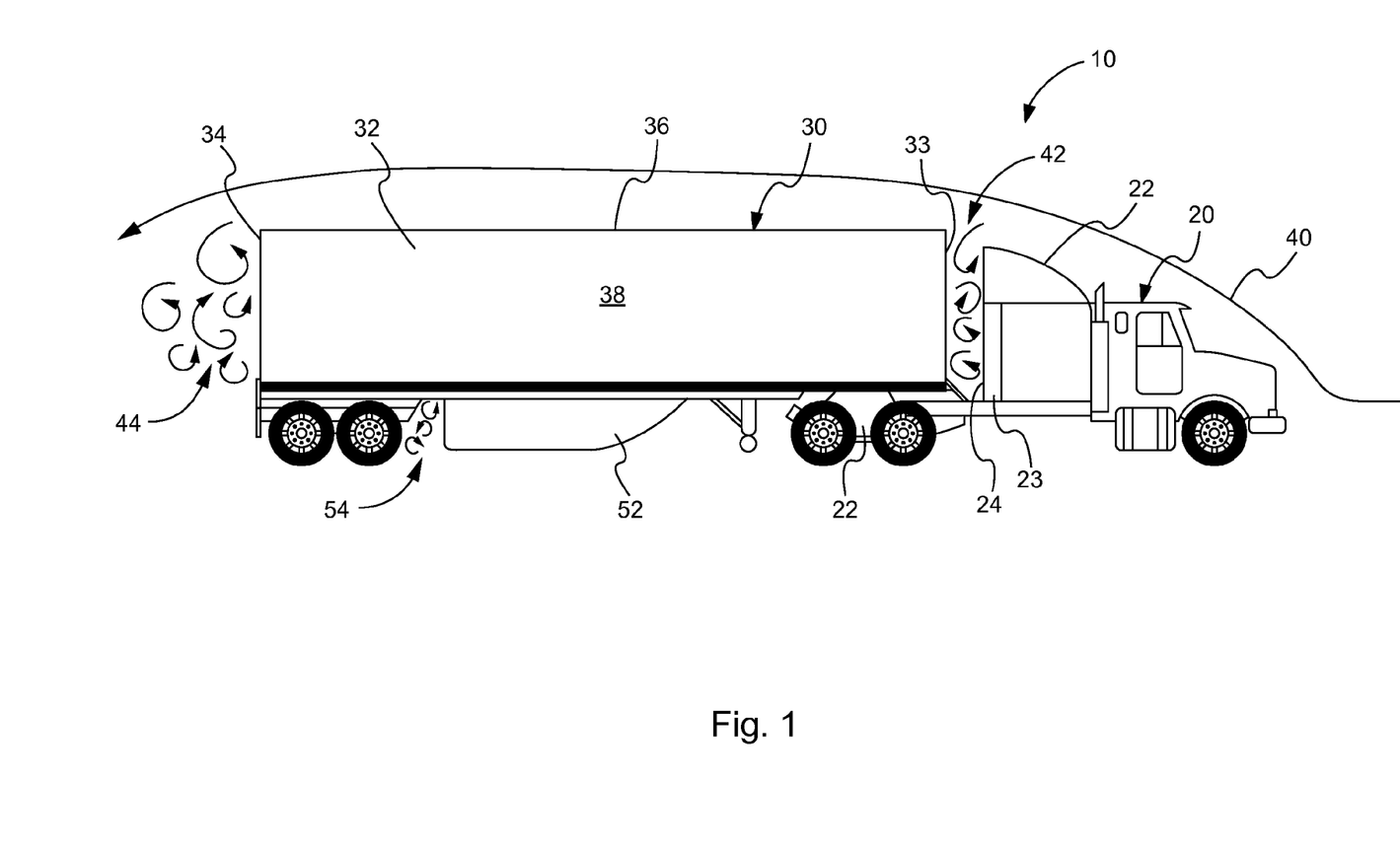
FIG. 1 is a side view of one embodiment of a tractor-trailer system.

Referring to FIG. 1, a tractor-trailer system 10 or semi-trailer truck is shown according to one embodiment. The system 10 includes a tractor 20 coupled to a passive vehicle (e.g. trailer 30) via a hitch mechanism 22 as is commonly known in the art. The tractor 20 includes an internal combustion engine (not shown), or some other propulsion system, configured to propel the tractor by driving one or more pair of non-passive wheels of the tractor. When coupled to the trailer 30, the tractor 20 is configured to move (e.g., pull or push) the trailer. The trailer 30 includes a cargo containment area 32 supported by frame rails and associated cross-members (not shown). The trailer 30 includes at least one rear axle assembly that couples the wheels to the trailer. As shown, the trailer 30 includes two rear axle assemblies with wheels, and, in some implementations, can include less or more than two rear axle assemblies. Some configurations of trailers 30 include a side skirt 52 coupled to a bottom of the trailer between the rear axle assembly of the trailer and the leading edge 33 of the trailer.

The tractor 20 may include an air shield 22 and side fairing 23. The air shield 22 is secured to a roof of the tractor 20. Further, the air shield 22 is sized and shaped to direct air 40 upward or outward around the leading surface 33 of the trailer 30. Similarly, the side fairing 23 is coupled to a side of the tractor 20, and is configured to direct air outward around the leading surface 33 of the trailer 30. Despite some of the air 40 being redirected around the leading surface 33 of the trailer 30, some of the air 40 experiences a flow separation at a trailing edge 24 of the air shield 22 and side fairing 23. As the flow separates from the trailing edge 24, the separation induces turbulent flow 42 directed into the space between the trailing edge or surface of the tractor 20 and the leading surface 33 of the trailer 30. The turbulent air between tractor 20 and trailer 30 creates a pressure differential that acts on the tractor to promote aerodynamic drag (e.g., pressure drag) on the tractor. Generally, the air 40 is flowing in a direction opposite the direction of the tractor 20 and trailer 30.

A similar aerodynamic drag phenomenon may exist at a trailing edge or surface 34 of the trailer 30. More specifically, as the air 40 flows past the trailing edge 34 of the trailer 30, some of the air 40 experiences a flow separation at a trailing edge 34 of the trailer. As the flow separates from the trailing edge 34, the separation induces turbulent flow 44 directed into a space behind the trailing edge or surface of the trailer 30. The turbulent air 44 behind the trailer 30 creates a pressure differential that acts on the trailer to promote aerodynamic drag (e.g., pressure drag) on the trailer. The same type of aerodynamic drag phenomenon may exist at a trailing edge or surface 33 of the side skirt 52. More specifically, as the air 40 flows past the trailing edge 53 of the side skirt 52, some of the air 40 experiences a flow separation at a trailing edge of the side skirt. As the flow separates from the trailing edge 53, the separation induces turbulent flow 54 directed into a space behind the trailing edge or surface of the side skirt 52. The turbulent air 54 behind the side skirt 52 creates a pressure differential that acts on the trailer to promote aerodynamic drag (e.g., pressure drag) on the trailer.

Figure 2:
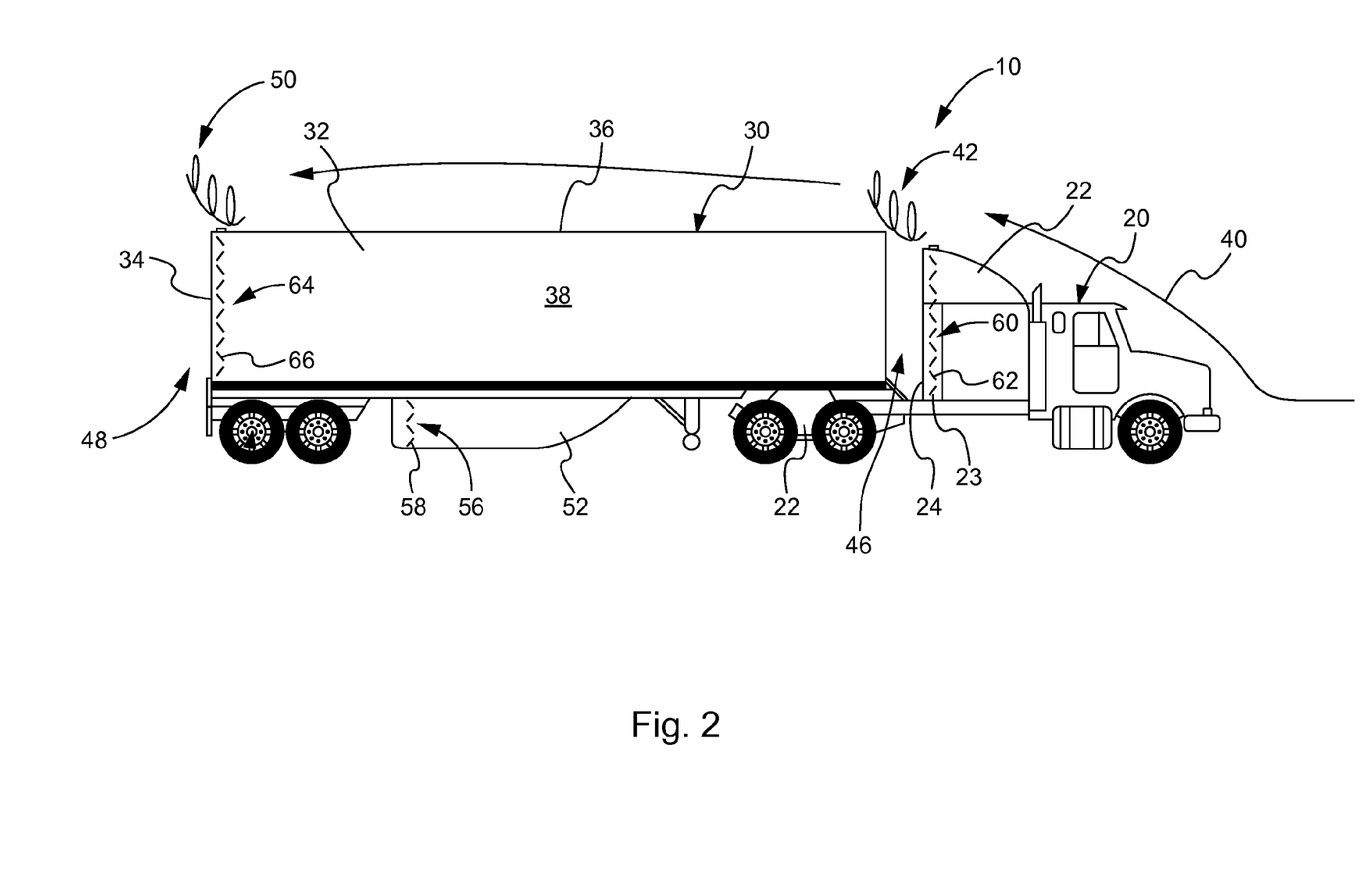
FIG. 2 is a side view of one embodiment of a tractor-trailer system with vortex-generating systems.
Figure 3A:
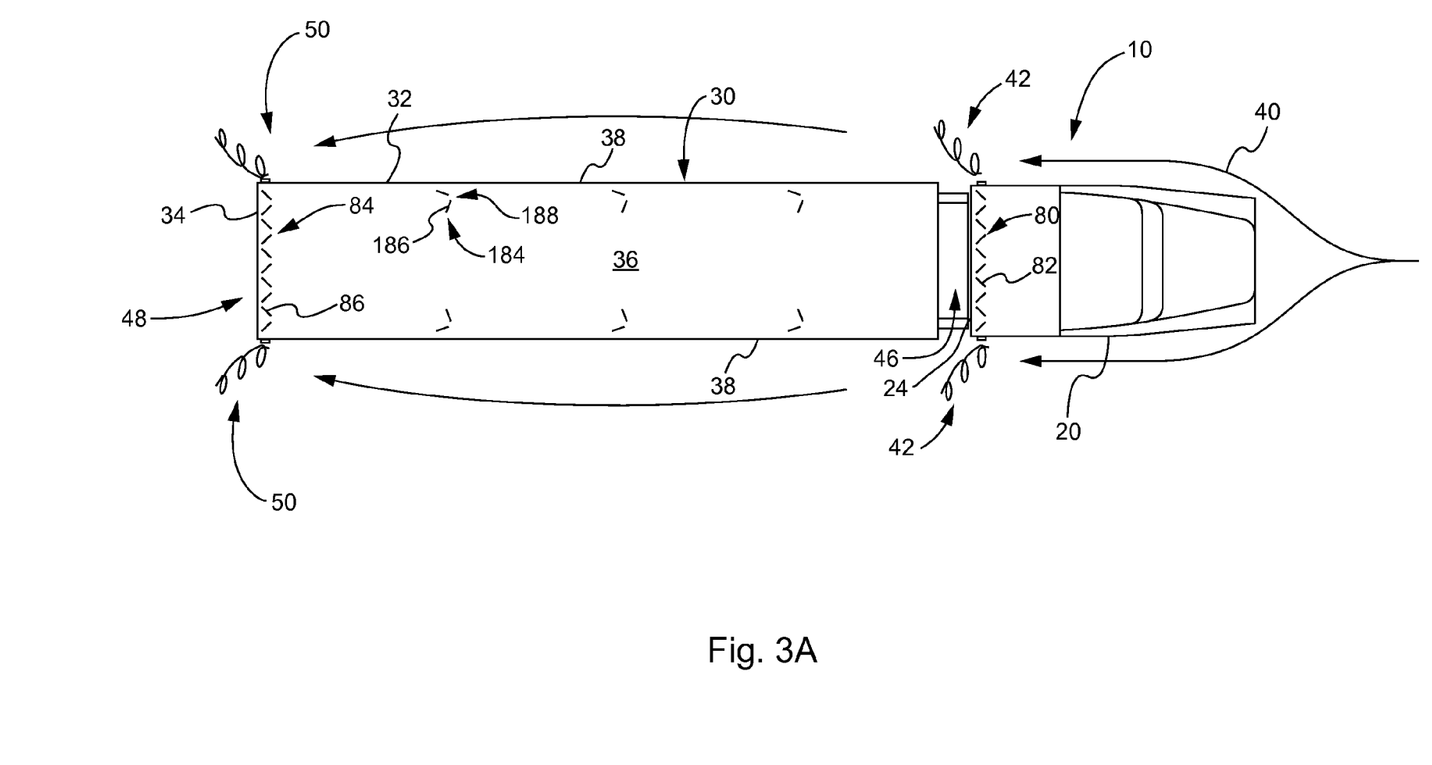
FIG. 3A is a top view of one embodiment of a tractor-trailer system with vortex-generating systems.
Figure 3B:
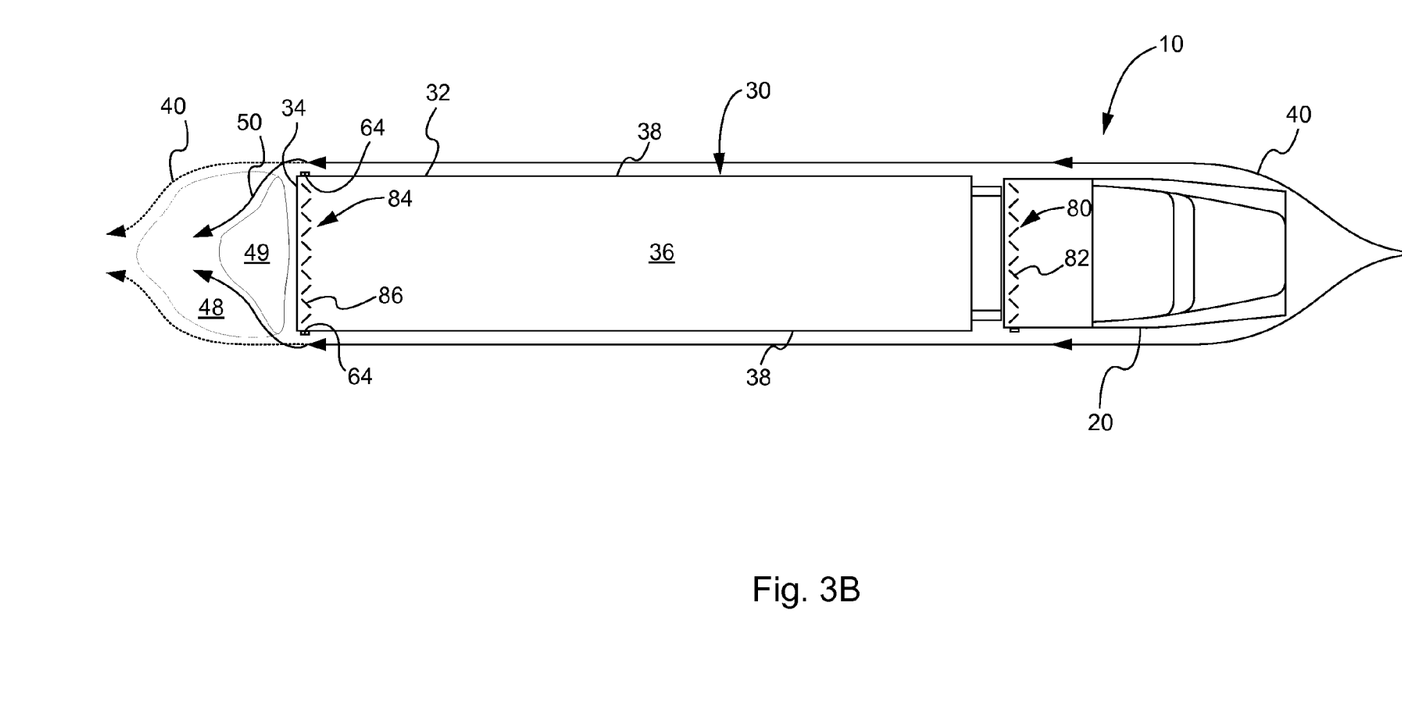
FIG. 3B is a top view of one embodiment of a tractor-trailer system with vortex-generating systems.

As shown in FIGS. 2 and 3, to mitigate turbulent flow behind the tractor 20 and trailer 30, the tractor-trailer system 10 is equipped with vortex-generating systems 60, 64, 80, 84 associated with the tractor and trailer, respectively. Each vortex-generating system 60, 64, 80, 84 includes an array of vortex-generating devices 62, 66, 82, 86 respectively, positioned proximate the trailing edges 24, 34 of the tractor and trailer, respectively. In certain implementations, the vortex-generating devices 62, 66, 82, 86 are blades oriented at an angle relative to the direction of air flow 40 past the blades. Generally, the blades induce outwardly-directed vortical flow of the air 40 away from the trailing edges 24, 34 of the tractor 20 and trailer 30 such that turbulent flow patterns in the respective spaces 46, 48 behind the tractor and trailer are significantly reduced. For example, as shown in FIG. 2, instead of the air flow 40 being separated from the tractor 20 at the trailing edge 24, which as described above causes turbulent flow patterns 42 in the space 46, the vortex-generating systems 60, 80 with the array of blades 62, 82 forces early and outward separation of the air 40 upstream of and away from the trailing edge 24 via a vortical air flow pattern 42. Similarly, instead of the air flow 40 being separated from the trailer 30 at the trailing edge 34, which as described above causes turbulent flow patterns 44 in the space 48, the vortex-generating systems 64, 84 with the array of blades 66, 86 forces early and outward separation of the air 40 upstream of and away from the trailing edge 34 via a vortical air flow pattern 50.

FIG. 3B shows how the vortical air flow patterns 50 created by the vertical vortex-generating systems 64 affect the air flow around the trailer 30. Pressure drag is caused by flow separation. Flow separation is when a fluid stream detaches from a surface of a body. Generally, laminar fluid flow experiences greater flow separation than turbulent fluid flow. In conventional tractor-trailers, the air 40 flowing around the trailer 30, which is substantially laminar, abruptly separates from the trailer 30 at the trailing edge 34, thereby creating a large low pressure pocket 48, commonly referred to as "wake". However, when a trailer 30 has vortex-generating systems installed thereon, the blades of the system 66 preemptively (before the trailing edge 34) transition the air 40 to turbulent flow (i.e., vortical air flow patterns 50). The turbulent flow of the vortical air flow patterns 50 experiences less flow separation at the trailing edge 34, thereby creating a wake 49 that is comparatively smaller than the conventional wake 48.

Accordingly, while the vortex-generating systems of the present disclosure are described as directing air outwardly from the moving object, the outward movement is immediate and is substantially locally isolated around the individual blades. The overall effect of the outward motion of the air around the blades of the vortex-generating systems of the present disclosure is to preemptively impart turbulence to the air flowing around the moving object, thereby diminishing the extent of flow separation that occurs at the trailing edge of the object and decreasing the volume of the wake.

The tractor 20 includes two vortex-generating systems 60 coupled to respective sides of the tractor 20. Each system 60 includes an array of vertically aligned blades 62 coupled to a respective exterior side of the tractor 20 proximate the trailing edge 24 of the side. In certain implementations, the vertically aligned blades 62 of each system 60 are coupled to and extend vertically along the side fairings 23 and opposing sides of the air shield 22. If no side fairings 23 or air shield 22 is used, the vertically aligned blades 62 can be coupled the exterior side of the main body (e.g., sleep compartment) of the tractor 40. As shown in FIG. 3A, the vertically aligned arrays of blades 62 induce vortical air flow patterns 42 that radiate laterally outwardly from the sides (and associated trailing edges 24) of the tractor 20. The vortex-generating system 80 includes an array of horizontally aligned blades 82 coupled to a top surface of the air shield 22, or roof of the tractor 20 if no air shield is present, proximate the trailing edge 24 of the air shield or roof. As shown in FIG. 2, the horizontally aligned array of blades 82 induce vortical air flow patterns 42 that radiate upwardly away from the top (and associated trailing edge 24) of the tractor 20.

Similar to the tractor 20, the trailer 30 of the tractor-trailer system 10 includes two vortex-generating systems 64 coupled to respective exterior sides 38 of the trailer 30. Each system 64 includes an array of vertically aligned blades 66 coupled to a respective exterior side 38 of the trailer 30 proximate the trailing edge 34 of the side. As shown in FIGS. 3A and 3B, the vertically aligned arrays of blades 66 induce vortical air flow patterns 50 that radiate laterally outwardly from the sides 38 (and associated trailing edges 34) of the trailer 30. The vortex-generating system 84 includes an array of horizontally aligned blades 86 coupled to a top surface 36 of the trailer 30 proximate the trailing edge 34 of the trailer. As shown in FIG. 2, the horizontally aligned array of blades 86 induces vortical air flow patterns 50 that radiate upwardly away from the top surface 36 (and associated trailing edge 34) of the trailer 30.

As shown in FIG. 2, to mitigate turbulent flow behind the side skirt 52 of the trailer 30, the side skirt 52 is equipped with a vortex-generating system 56 on each side of the side skirt. The vortex-generating system 56 includes an array of vortex-generating devices 58 positioned proximate the trailing edge 53 of the side skirt. In certain implementations, the vortex-generating devices 58 are blades oriented at an angle relative to the direction of air flow 40 past the blades. As with the blades of the other vortex-generating systems described above, the blades 58 induce outwardly-directed vortical flow of the air 40 away from the trailing edge 53 of the side skirt 52 such that turbulent flow patterns in the spaces behind the side skirt is significantly reduced.

Figure 8:
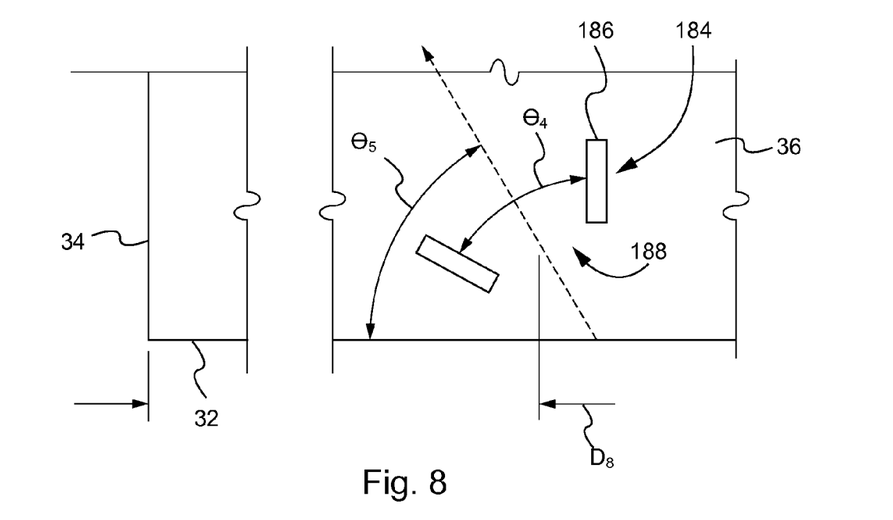
FIG. 8 is a partial perspective view of a top surface of a trailer showing one embodiment of a pair of blades of a vortex-generating system.

Although not shown, the tractor 20 and trailer 30 may be impacted by cross-winds during operation of the system 10. The cross-winds can be substantially perpendicular and angled with respect to the main air flow 40 impacting the system 10. Further, the same type of drag-inducing turbulent flow caused by flow separation of the main flow 40 at the trailing edge 34 of the trailer 30 can occur at the sides 38 of the trailer due to flow separation of the cross-winds at the lateral edges of the sides 38 of the trailer 30. To mitigate turbulent flow at the sides 38 of the trailer 30, the trailer is equipped with vortex-generating systems 184 proximate a respective side 38 of the trailer. Each vortex-generating system 184 includes an array of vortex-generating devices 186 positioned proximate the edges of the side surfaces 38 of the tractor and trailer. In certain implementations, the vortex-generating devices 186 are blades oriented at an angle relative to the sides 38 of the trailer. For example, as shown in FIG. 8, the vortex-generating system 184 includes a plurality of pairs 188 of blades 186 defining an angle $\theta_4$ between each other, with an angle $\theta_5$ defined between a side 38 of the trailer 30 and a vector bifurcating the angle $\theta_4$. In some implementations, the angle $\theta_4$ is between about 30° and about 100° degrees. In yet some implementations, the angle $\theta_5$ can be between about 10° and about 90°. In one specific implementation, the angle $\theta_5$ is about 17.5°. Generally, each pair 188 of the blades 186 induces a separate outwardly-directed vortical flow of crosswinds away from a respective side 38 of the trailer 30 such that turbulent flow patterns in the spaces adjacent the sides of the trailer 30 due to crosswinds are significantly reduced. Each pair 188 of blades 186 may be positioned a distance $D_8$ away from the trailing edge 34 or an adjacent pair of blades. In one particular implementation, the distance $D_8$ is about 48 inches.

Although in the illustrated embodiment of FIGS. 2 and 3, the tractor-trailer system 10 includes side vortex-generating systems 60 and a top vortex-generating system 80 on the tractor 20, and side vortex-generating systems 64 and a top vortex-generating system 84 on the trailer 30, in some embodiments, only the tractor or trailer includes vortex-generating systems. Further, in yet some embodiments, one or both of the tractor 20 and trailer 30 may have only one of the side and top vortex-generating systems. For example, in some implementations, the tractor 20 may have only side vortex-generating systems 60 and no top vortex-generating system 80, or vice versa. Similarly, the trailer 30 may have only side vortex-generating systems 64 and no top vortex-generating system 84, or vice versa Referring to FIG. 4, the array of vertically aligned blades 66 of the vortex-generating system 64 are arranged in pairs 68 of blades. The blades 66 of each pair are spatially separated from each other by a distance $D_1$, and each pair of blades 66 can be separated from an adjacent pair of blades by a distance $D_2$. The distances $D_1$ and $D_2$ can be measured from the geometric center-points of the blades. In some implementations, the distance $D_1$ is the same for each pair of blades, while in other implementations, the distance $D_1$ may vary from pair to pair. In one implementation, the distance $D_1$ is about seven inches, while in other implementations, the distance $D_1$ is between about 5 inches and about 12 inches. Additionally, the distance $D_2$ can be the same as, or different than (e.g., bigger or smaller), the distance $D_1$. In some implementations, the distance $D_2$ is the same for each adjacent pair of blades 66, and in other implementations, the distance $D_2$ between adjacent pairs can vary.

Figure 4:
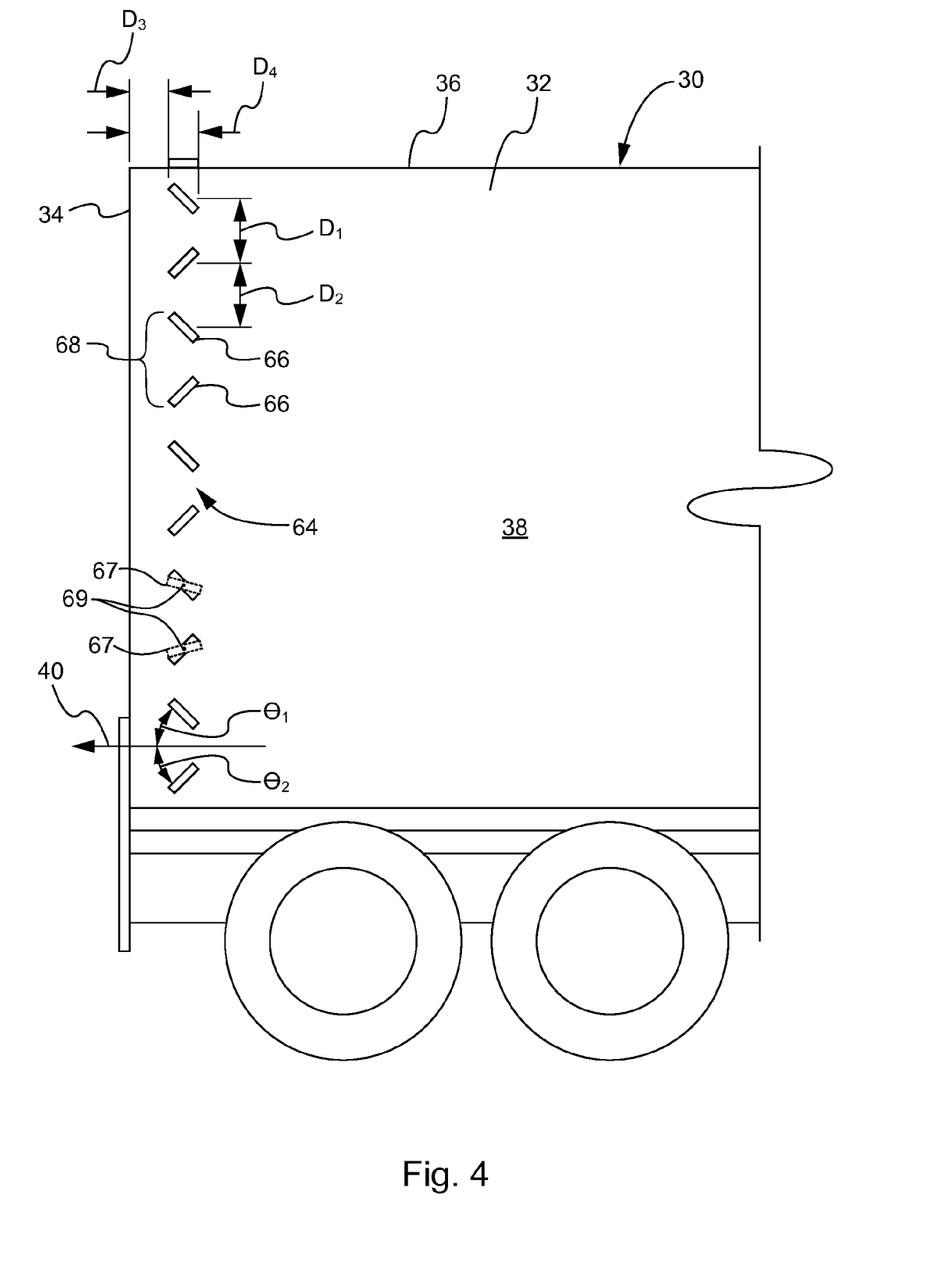
FIG. 4 is a side view one embodiment a vortex-generating system with an array of vertically aligned blades.
Figure 5:
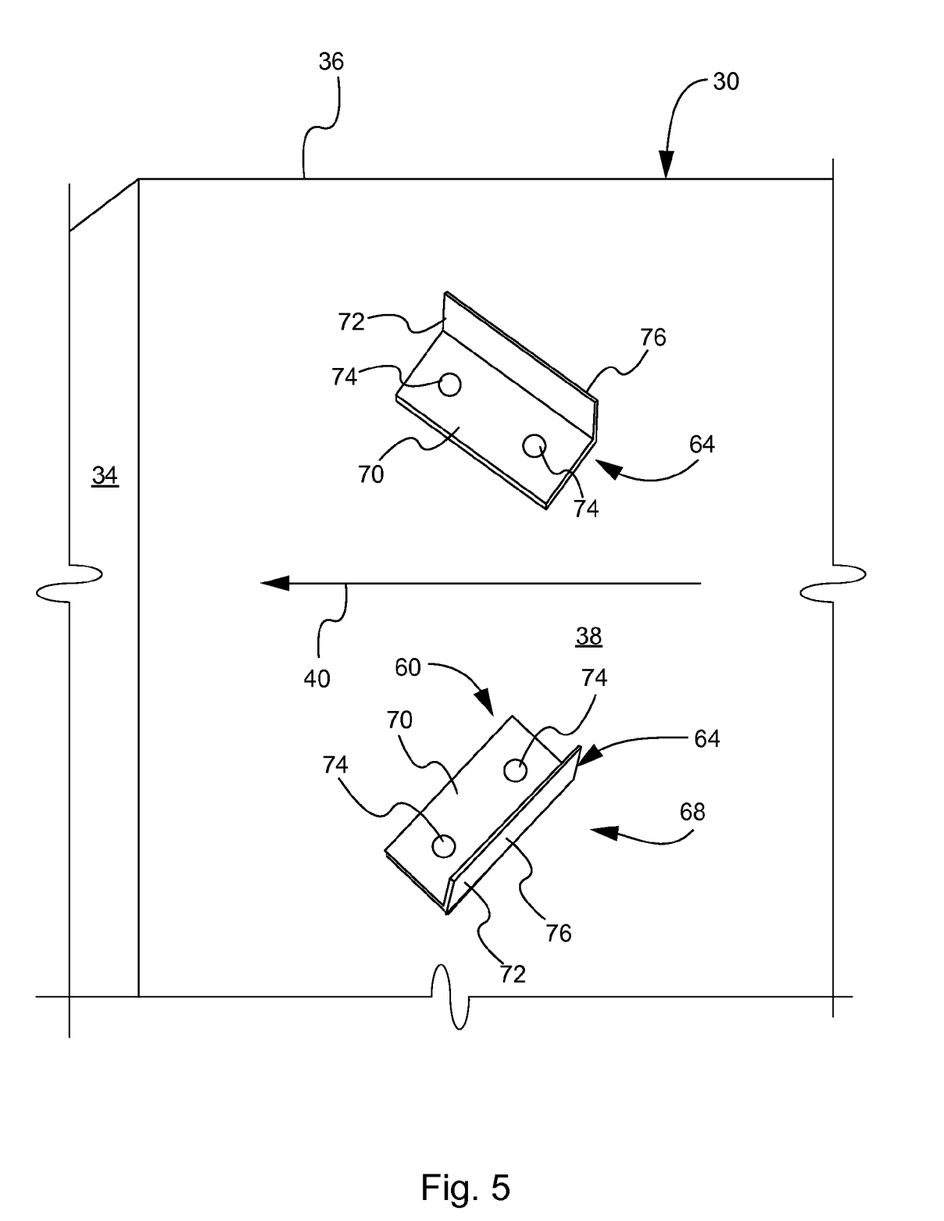
FIG. 5 is a partial perspective view of an upper corner of a trailer showing one embodiment of a pair of blades of a vortex-generating system.

As shown in FIG. 5, each blade 66 includes a raised air-deflection portion 72 or plate that extends substantially transversely from the side 38 of the trailer 30. The air-deflection portion 72 defines an air impact surface 76 that faces the oncoming flow of air 40. Referring back to FIG. 4, the impact surfaces 76 of the air-deflection portion 72 of the blades 66 are oriented at angles $\theta_1$, $\theta_2$, respectively, relative to the direction of air flow 40, which as shown, can be in the horizontal direction or parallel to the top surface 36 of the trailer 30. As defined, the angles $\theta_1$, $\theta_2$ can be the same or different. In some implementations, each of the angles $\theta_1$, $\theta_2$ is between about 30° and about 50°. In one implementation, each of the angles $\theta_1$, $\theta_2$ is about 45°. In certain implementations, as shown, the angle $\theta_2$ is equal to the negative of angle $\theta_1$.

Further, each blade 66 of the vortex-generating system 64 can be positioned on the on the side 38 of the trailer 30 such that a trailing edge 90 of the impact surface 76 of the blade 66 is a distance $D_3$ away from the trailing edge 34 of the trailer, and a leading edge 92 of the impact surface blade is a distance $D_4$ away from the trailing edge of the trailer. In some implementations, the distance $D_4$ is between about 6 inches and 12 inches. In one implementation, the distance $D_4$ is between about 8 inches and about 10 inches. According to various implementations, the distance $D_3$ can be set equal to between about 1.2 multiplied by $D_1$ and about 2.0 multiplied by $D_1$. According to yet some implementations, the distance $D_4$ can be set equal to between about 1.3 multiplied by $D_1$ and about 3.0 multiplied by $D_1$.

In some implementations, the distances $D_1$, $D_2$, $D_3$, $D_4$ and angles $\theta_1$, $\theta_2$ are based on a targeted speed of the trailer 30, which is proportional to the speed of the air 40. The targeted speed of the trailer 30 can be defined as the predicted speed of the trailer under desired operating conditions of the trailer. For example, for conventional long-distance transportation applications, the desired operating conditions are associated with a desired fuel efficiency, which is accomplished at the predicted or targeted speed. For on-highway applications, the predicted or targeted speed can be between about 60 mph and 65 mph in certain implementations. Accordingly, the distance $D_4$ can be expressed in terms of a ratio of the distance $D_4$ away from the trailing edge 34 and the targeted speed of the trailer 30. In one implementation, the ratio of the distance $D_4$ and the targeted speed can be between about 0.12 in/mph and about 0.16 in/mph. Similarly, the distance $D_1$ can be expressed in terms of a ratio of the distance $D_1$ and the targeted speed of the trailer 30. In one implementation, the ratio of the distance $D_1$ and the targeted speed can be between about 0.10 in/mph and about 0.11 in/mph. Further, the angles $\theta_1$, $\theta_2$ can be expressed in terms of a ratio of the angles $\theta_1$, $\theta_2$ and the targeted speed of the trailer 30. In one implementation, the ratio of each of the angles $\theta_1$, $\theta_2$ and the targeted speed can be between about 0.46 degrees/mph and about 0.83 degrees/mph.

It is contemplated that in some embodiments one or more of the position of the blades relative to a trailing edge, the position of the blades relative to each other, and the angle of the blades relative to a direction of air flow can be modified in situ. For example, referring to FIG. 4, one or more of the blades may be mounted to the trailer 30 via a rotatable fastener 69 to allow the blades 66 to assume multiple rotational positions (as shown in FIG. 4 by the dashed lines that represent alternate rotational positions 67).

The rotatable fasteners 69 may be actively rotatable or passively rotated and the rotational position of the blades may be a function of the speed of the tractor-trailer system. For example, in some embodiments, a tractor-trailer system can include a series of servo motors coupled to the blades, with the motors being controllable by an electronic control module. In such embodiments, as the speed of the tractor and trailer changes, the electronic control module can automatically actuate the servo motors to adjust the position and/or orientation of the blades based on the actual speed of the tractor and trailer. In this manner, the position and orientation of the blades can be optimized at any speed of the tractor and trailer, as opposed to just the targeted speed of the tractor and trailer.

In another embodiment, although not depicted, the blades of the vortex-generating systems may be mounted on a track subsystem that allows the translational position of the blades to be modified. For example, the position of the blades relative to a trailing edge $D_3$, $D_4$ and/or the position of the blades relative to each other $D_1$, $D_2$ can be modified via a track subsystem that is controlled via an electronic control module. It is contemplated that one, some, or all of the blades of a vortex-generating system may be mounted to the truck/trailer via rotatable fasteners 69 and/or a track subsystem.

In the illustrated embodiment of FIG. 4, the vortex-generating system 64 includes five pair of blades 66, and ten total blades. However, in other embodiments, the vortex-generating system 64 can include more or less than five pair of blades 66, and more or less than ten total blades.

Although the above description of the vortex-generating system of FIG. 4 applies specifically to the vortex-generating systems 64 on the sides 38 of the trailer 30, the principles and features, including the distances and angles of the blades, described above apply equally to the vortex-generating systems 60 on the sides of the tractor 20, as well as to the vortex-generating systems 80, 84 on the tops of the tractor and trailer, respectively. In other words, the same description, ranges, and ratios of the vortex-generating system 64 apply to the vortex-generating systems 60, 80, 84.

Referring to FIG. 5, which is a partial perspective view of an upper corner of the trailer 30 between the top surface 36 and the trailing edge 34 of the trailer, a pair 68 of vortex-generating blades 66 of the vortex-generating system 64 is shown in more detail. The position and angle of the blades 66 are shown relative to the direction of air flow 40 along the side surface 38 of the trailer 30. Each blade 66 includes a base plate 70 and an air deflection portion 72 that extends uprightly away from the base plate 70. The base plate 70 has a width $D_5$ and a length $D_7$. Similarly, the air deflection portion 72 has a height $D_6$ and a length $D_7$. In some implementations, the height and width $D_5$, $D_6$ each is about one inch and the length $D_7$ is about two inches. Accordingly, the ratio of the height to length, or width to length, of each blade 66 can be about 0.5. In yet some implementations, the height and width $D_5$, $D_6$ each is between about 0.5 inches and 3 inches, and the length $D_7$ is between about 1 inches and five inches. Accordingly, in such implementations, the ratio of the height to length, or width to length, of each blade 66 can be between about 0.1 and about 3.

Figure 6:
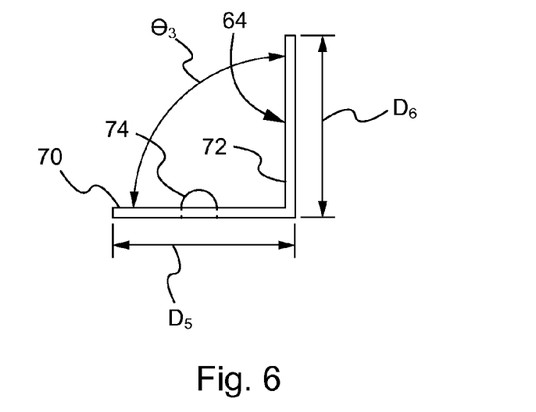
FIG. 6 is a side view of one embodiment of a vortex-generating system.

As shown in FIG. 6, the air deflection portion 72 extends uprightly from the base plate 70 such that the air impact surface 76 of the air deflection portion forms an angle $\theta_3$ relative to the base plate. The base plate 70 is mounted flat onto the side 38 of the trailer 30 such that the air impact surface 76 of the air deflection portion forms the angle $\theta_3$ relative to the surface of the side of the trailer. The angle $\theta_3$ may be substantially 90 degrees. In another embodiment, the angle $\theta_3$ may be greater than or less than 90 degrees.

Figure 7:
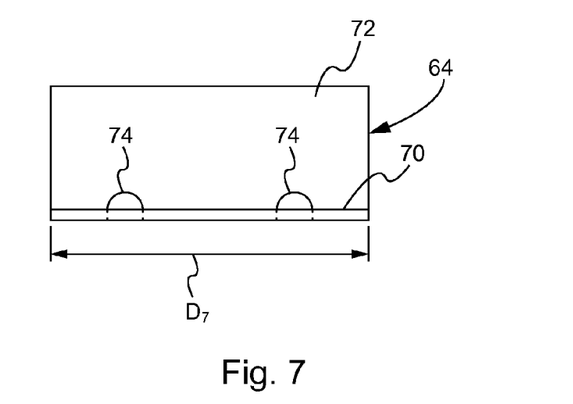
FIG. 7 is a bottom view of one embodiment of a vortex-generating system.

The base plate 70 can be mounted onto the side 38 of the trailer 30 using any of various techniques, such as fastener techniques, adhesive techniques, welding techniques, co-molding techniques, and the like. In the illustrated embodiment of FIGS. 5-7, the base plate 70 includes apertures for receiving a fastener 74. The fastener 74 can be a screw, nail, rivet, or other fastener configured to engage (e.g., threadably engage, embed within, etc.) the side 38 of the trailer 30 to secure the blade 66 to the side. In the illustrated embodiment, each blade 66 is secured with two fasteners 74, but in other embodiments fewer or more than two fasteners can be used to secure the blade to the side 38.

Each blade 66 is secured to the side 38 in an orientation that ensures the impact surface 76 defines an angle with the direction of air 40 corresponding with the corresponding angles $\theta_1$, $\theta_2$. With the impact surfaces 76 angled in this manner, the blades 22 of each pair 68 cooperate to engage the air 40 flowing along the side 38 of the trailer between the blades, and redirect this air outwardly away from the side in a separate vortical flow pattern. Accordingly, for systems with five pairs of blades, the system effectively generates five separate vortical flow patterns. As described above, the vortex-generating systems provide a short transition to turbulence, thereby reducing the pressure drag. In other words, the vortex-generating systems preemptively impart turbulence to the air flow around the tractor/trailer and the turbulent flow experiences less flow separation, thereby decreasing the volume of the wake and diminishing the pressure drag that would otherwise be created by the comparatively larger flow separation region that would exist because of the abrupt edge between a side surface and a trailing surface of an object in motion (see FIG. 3B).

Although FIG. 5 shows the blades 66 of the blade pair 68 secured to the side 38 of the trailer 30, the above description of FIG. 5 is not limited to the side vortex-generating system 64. In other words, the above description of the blade 66 and blade pair 68 of the vortex-generating system 64 is equally applicable to the blades 62, 82, 86 and the corresponding blade pairs of the side and top vortex-generating systems 60, 80, and 84.

Figure 9A:
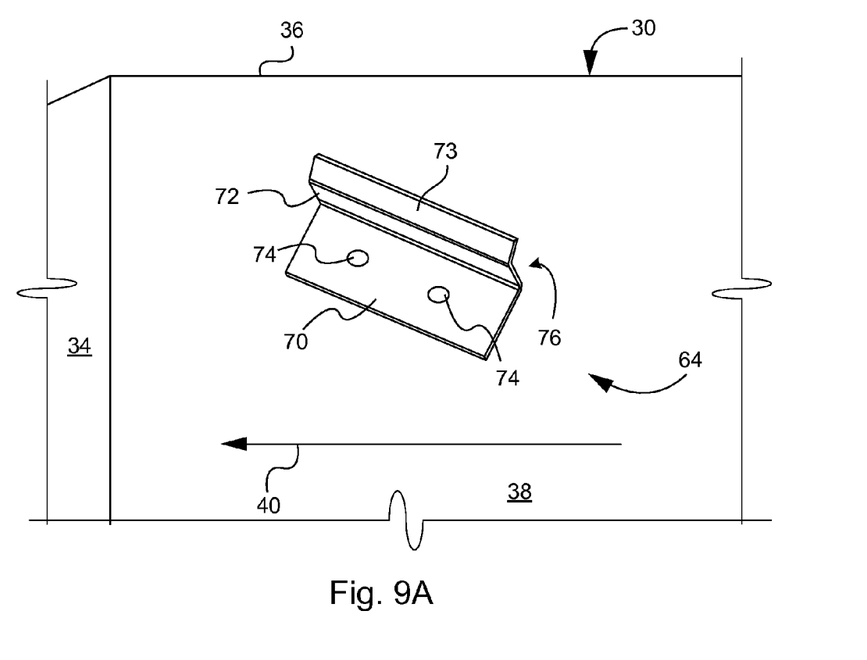
FIG. 9A is a partial perspective view of a trailer showing another embodiment of a blade of a vortex-generating system.
Figure 9B:
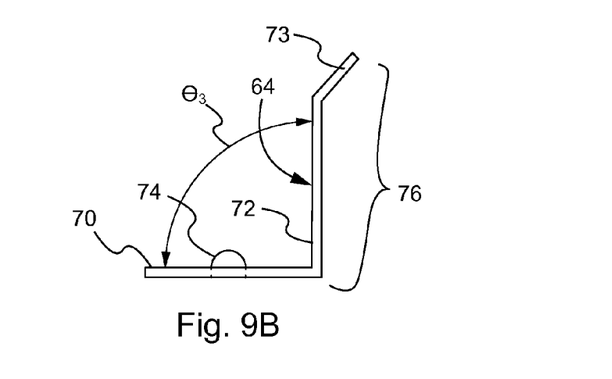
FIG. 9B is a side view of one embodiment of the blade of the vortex-generating system of FIG. 9A.

FIG. 9A is a partial perspective view of a trailer 30 showing another embodiment of a blade 166 of a vortex-generating system and FIG. 9B is a side view of the same embodiment of the blade 166. As described above, the position and angle of the blade 166 is shown relative to the direction of air flow 40 along the side surface 38 of the trailer 30. The blade 166 includes a base plate 70 and an air deflection portion 72 that extends outwardly away from the base plate 70. The blade 166 further includes an angled tip portion 73 that extends at angle from the air deflection portion 72. In one embodiment, the angled tip portion 73 is integrated with and is a segment of the air deflection portion 72. In another embodiment, the angled tip portion 73 is coupled to the air deflection portion 72 as a retro-fit installation.

The angled tip portion 73 forms part of the air impact surface 76, thus affecting the flow of air around the blade 166. In one embodiment, as depicted in FIGS. 9A and 9B, the angled tip portion 73 extends away from base plate 70 and forms an angled, concave-like air impact surface 76. The length of the various portions 70, 72, 73 of the blade 166 and the angles between the various portions 70, 72, 73 of the blade 166 may vary according to the specifics of a given application. In one embodiment, the physical dimensions and configuration of the installed blades may be at least partially determined by the anticipated speeds of the tractor-trailer. For example, the aerodynamic inefficiencies of the concave-like air impact surface 76 of the blade 166 depicted in FIGS. 9A and 9B may outweigh the drag reducing benefits of the vortex-generating blades at certain speed/operating conditions. Accordingly, in one embodiment, angled tip portions 73 are included in applications where the expected speed is below a certain threshold value (e.g., about 60 mph).

In another embodiment, the configuration and position of the angled tip portion 73 may be controllable. For example, the junction between the air deflection portion 72 and the angled tip portion 73 may be hinged or otherwise rotatably coupled together to allow the angle between the air deflection portion 72 and the angled tip portion 73 to change, whether actively or passively, depending on the operating conditions/speed of the tractor-trailer.

Figure 10A:
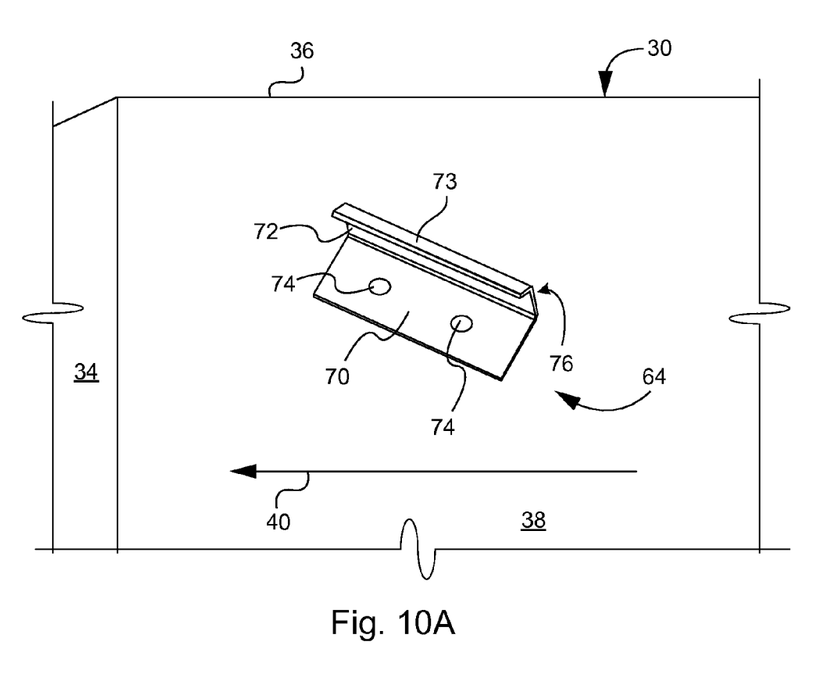
FIG. 10A is a partial perspective view of a trailer showing another embodiment of a blade of a vortex-generating system.
Figure 10B:
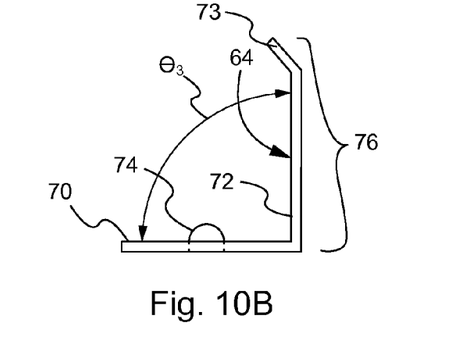
FIG. 10B is a side view of one embodiment of the blade of the vortex-generating system of FIG. 10A.

FIG. 10A is a partial perspective view of a trailer 30 showing another embodiment of a blade 266 of a vortex-generating system and FIG. 10B is a side view of the same embodiment of the blade 266. The blade 266 includes a base plate 70 and an air deflection portion 72 that extends outwardly away from the base plate 70. The blade 266 further includes an angled tip portion 75 that extends at angle from the air deflection portion 72. In one embodiment, the angled tip portion 75 is integrated with and is a segment of the air deflection portion 72. In another embodiment, the angled tip portion 75 is coupled to the air deflection portion 72 as a retro-fit installation.

The angled tip portion 75 forms part of the air impact surface 76, thus affecting the flow of air around the blade 266. In one embodiment, as depicted in FIGS. 10A and 10B, the angled tip portion 75 extends away from base plate 70 and forms an angled, convex-like air impact surface 76. As described above, the length of the various portions 70, 72, 75 of the blade 266 and the angles between the various portions 70, 72, 75 of the blade 266 may vary according to the specifics of a given application. The blade 266 of FIGS. 10A and 10B may be implemented according to the details described above with reference to blade 166.

In general, the various embodiments of the vortex-generating systems may be implemented in a variety of configurations according to the specifics of a given application. For example, the blades may be mounted in corresponding pairs as described with reference to FIG. 4 or the blades may be mounted in a non-patterned configuration to further impart turbulence to the air flow. Additionally, the teachings and descriptions of a specific embodiment of blades, for example the blades 166, 266 with the angled tip portions 73, 75 may be applied in applications not explicitly described herein. For example, vortex-generating systems may be mounted to a top surface of a tractor-trailer to mitigate lateral drag caused by cross-winds. According to some implementations, the blades are integrated into the side of the trailer 30, or side fairings and air shield of the tractor 20, via a co-molding technique to form a monolithic one-piece construction with the trailer, side fairings, and/or air shield.

In one embodiment, the vortex-generating systems may be implemented to improve handling and/or stability. For example, because the vortex-generating systems of the present disclosure involve a comparatively shorter transition to turbulence, when compared to conventional tractor-trailers, the formation and destabilizing effect of the low pressure pockets proximate the trailing surface of an object in motion are mitigated.

Additionally, although the above drag mitigation system with vortex-generating systems is shown and described in association with a tractor-trailer system, in other embodiments, the features, principles, and advantages of the drag mitigation system of the present disclosure can be applied to any of various moving objects with a trailing edge.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements.

Further, as used herein, securing one element to another element can include direct securing and indirect securing. Additionally, as used herein, "adjacent" does not necessarily denote contact. For example, one element can be adjacent another element without being in contact with that element.

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vortex-generating system for a moving object having a trailing edge, comprising:
  a first blade coupled to the object and positioned proximate the trailing edge, the first blade being positioned at a first angle relative to a direction of the moving object; and
  a second blade coupled to the object, positioned proximate the trailing edge, and spaced apart from the first blade, the second blade being positioned at a second angle equal to the negative of the first angle, wherein the first blade and the second blade are rotatable coupled to the object.

2. The vortex-generating system of claim 1, wherein the first blade and the second blade are rotatably coupled to the object via servo motors controlled by an electronic control module.

3. The vortex-generating system of claim 1, wherein the first blade and the second blade each comprise a base plate and an air deflection portion.

4. The vortex-generating system of claim 3, wherein the first blade and the second blade further comprise an angled tip portion extending from the air deflection portion.

5. The vortex-generating system of claim 4, wherein the air deflection portion and the angled tip portion form an air impact surface that has an angled, concave-like structure.

6. The vortex-generating system of claim 4, wherein the air deflection portion and the angled tip portion form an air impact surface that has an angled, convex-like structure.

7. A vortex-generating system for a moving object having a trailing edge, comprising:
  a first blade coupled to the object and positioned proximate the trailing edge; and
  a second blade coupled to the object, positioned proximate the trailing edge, and spaced apart from the first blade;
  wherein the first and second blade cooperate to induce an outwardly directed vortical flow of air away from the trailing edge of the object.

8. The vortex-generating system of claim 7, wherein the first blade and the second blade are rotatably coupled to the object.

9. The vortex-generating system of claim 8, wherein the first blade and the second blade are rotatably coupled to the object via servo motors controlled by an electronic control module.

10. The vortex-generating system of claim 7, wherein the first blade and the second blade each comprise a base plate and an air deflection portion.

11. The vortex-generating system of claim 10, wherein the first blade and the second blade further comprise an angled tip portion extending from the air deflection portion.

12. The vortex-generating system of claim 11, wherein the air deflection portion and the angled tip portion form an air impact surface that has an angled, concave-like structure.

13. The vortex-generating system of claim 11, wherein the air deflection portion and the angled tip portion form an air impact surface that has an angled, convex-like structure.

14. A vortex-generating system for a moving object having a lateral edge across which a crosswind flows, comprising:
   a first blade coupled to the object and positioned proximate the lateral edge; and
   a second blade coupled to the object, positioned proximate the lateral edge, and spaced apart from the first blade;
   wherein the first and second blade cooperate to induce an outwardly directed vortical flow of air away from the lateral edge of the object.

15. The vortex-generating system of claim 14, wherein the first blade and the second blade each comprise a base plate and an air deflection portion.

16. The vortex-generating system of claim 15, wherein the first blade and the second blade further comprise an angled tip portion extending from the air deflection portion.

17. The vortex-generating system of claim 16, wherein the air deflection portion and the angled tip portion form an air impact surface that has an angled, concave-like structure.

18. The vortex-generating system of claim 16, wherein the air deflection portion and the angled tip portion form an air impact surface that has an angled, convex-like structure.

19. A tractor-trailer system, comprising:
   a tractor having a first trailing edge;
   a plurality of first angled blades coupled to the tractor proximate the first trailing edge, wherein the plurality of first angled blades cooperate to induce an outwardly directed vortical flow of air away from the first trailing edge of the tractor;
   a trailer coupled to the tractor, the trailer comprising a second trailing edge; and
   a plurality of second angled blades coupled to the trailer proximate the second trailing edge, wherein the plurality of second angled blades cooperate to induce an outwardly directed vortical flow of air away from the second trailing edge of the trailer.

* * * * *